US008131687B2

(12) United States Patent
Bates et al.

(10) Patent No.: US 8,131,687 B2
(45) Date of Patent: Mar. 6, 2012

(54) FILE SYSTEM WITH INTERNAL DEDUPLICATION AND MANAGEMENT OF DATA BLOCKS

(75) Inventors: Allen K. Bates, Tucson, AZ (US); Nils Haustein, Soergenioch (DE); Craig A. Klein, Tucson, AZ (US); Frank Krick, Ockenheim (DE); Ulf Troppens, Mainz (DE); Daniel Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 481 days.

(21) Appl. No.: 12/270,101

(22) Filed: Nov. 13, 2008

(65) Prior Publication Data
US 2010/0121825 A1 May 13, 2010

(51) Int. Cl.
G06F 7/14 (2006.01)
G06F 13/00 (2006.01)
(52) U.S. Cl. ........ 707/692; 707/664; 707/674; 707/609; 711/162
(58) Field of Classification Search .................. 707/202, 707/204, 999.202, 999.204, 692, 693, 674, 707/664, 200, 205, 206, 999.2, 999.205, 707/999.206, 609; 711/162
See application file for complete search history.

(56) References Cited

U.S. PATENT DOCUMENTS

| 6,889,297 | B2* | 5/2005 | Krapp et al. ................... 711/159 |
| 2005/0071436 | A1* | 3/2005 | Hsu et al. ....................... 709/212 |
| 2008/0005141 | A1 | 1/2008 | Zheng et al. |
| 2008/0016131 | A1 | 1/2008 | Sandorfi et al. |
| 2009/0049260 | A1* | 2/2009 | Upadhyayula ................ 711/162 |
| 2010/0042790 | A1* | 2/2010 | Mondal et al. ................. 711/161 |
| 2010/0077013 | A1* | 3/2010 | Clements et al. ............. 707/822 |

* cited by examiner

Primary Examiner — James Trujillo
Assistant Examiner — Bruce Moser
(74) Attorney, Agent, or Firm — Cantor Colburn LLP; Steven Bennett

(57) ABSTRACT

A method for deduplicating and managing data blocks within a file system includes adding a deduplication identifier to each pointer pointing to a data block to indicate whether the data block is deduplicated, detecting duplicate data blocks, determining whether one of the duplicate data blocks has been deduplicated, when detected, determining that one duplicate data block is a master copy when it is determined that one duplicate data block has been deduplicated, selecting one of the duplicate data blocks to be a master copy when it is determined that the duplicate data blocks have not been deduplicated, and setting the deduplication identifier of the selected duplicate data block to indicate deduplication, and determining that the other duplicate data block is a new duplicate data block and setting the deduplication identifier of the other duplicate data block to indicate deduplication and directing the respective pointer to the master copy.

14 Claims, 7 Drawing Sheets

```
struct ext2_inode {
    u16    i_mode;                       /* File mode */
    u16    i_uid;                        /* Low 16 bits of Owner Uid */
    u32    i_size;                       /* Size in bytes */
    u32    i_atime;                      /* Access time */
    u32    i_ctime;                      /* Creation time */
    u32    i_mtime;                      /* Modification time */
    u32    i_dtime;                      /* Deletion Time */
    u16    i_gid;                        /* Low 16 bits of Group Id */
    u16    i_links_count;                /* Links count */
    u32    i_blocks;                     /* Blocks count */
    u32    i_flags;                      /* File flags */
    u32    i_block[EXT2_N_BLOCKS];       /* Pointers to blocks */
    u32    i_generation;                 /* File version (for NFS) */
    u32    i_file_acl;                   /* File ACL */
    u32    i_dir_acl;                    /* Directory ACL */
    u32    i_faddr;                      /* Fragment address */
    struct {
        u8    l_i_frag;                  /* Fragment number */
        u8    l_i_fsize;                 /* Fragment size */
```

FIG. 1
PRIOR ART

FILE SYSTEM WITH INTERNAL DEDUPLICATION AND MANAGEMENT OF DATA BLOCKS

BACKGROUND

The present invention relates to deduplication of data blocks, and more specifically, to a method for de-duplicating and managing data blocks within the file system.

File systems typically organize a capacity of an underlaying block storage device in data blocks of a fixed size such as 4 KB, for example. Each file within the file system typically has its own data block(s). Each data block is identified by a 32 bit or 64 bit number starting with zero, this number represents a pointer to a respective data block. Therefore, a conventional file system manages $2^{32}$ or $2^{64}$ different data blocks, respectively, which defines the maximum capacity of the file system.

A conventional Unix-like file system uses inodes to store metadata of each file. FIG. 1 illustrates a data structure 1 for inodes of a conventional file system. As shown in FIG. 1, the data structure 1 includes an i_size field, for example, that records the size of the file in bytes. Depending on the file's size, more or less data blocks are required to store the file's content. The data structure also includes an i_block [EXT2_N_BLOCKS] array, which is an array of typically fifteen 32-bit numbers that point to the file's associated data blocks. FIG. 2 illustrates a relationship between an inode and data blocks within a conventional file system. As shown in FIG. 2, an inode 10 is shown including a plurality of i_blocks [0]-i_blocks [14]. The first twelve i_blocks [0]. . . [11] point to the first twelve data blocks, i.e., direct data blocks 15. The i_block[12] element points to a data block (i.e., an indirect block of pointers) 16 which point to indirect data blocks 18. The data block 16 addressed by element i_block[12] does not contain any file data itself; instead, it includes additional i_block[. . . ] elements which point to additional data blocks 18. The i_block[13] element points to an indirect block of pointers 20, for which each element points to a double indirect block of pointers 22, for which each element in turn points to a double indirect data block 24. In addition, i_block [14] element points to an indirect block of pointers 26, for which each element points to a double indirect block of pointers 28, for which each element points to a triple indirect block of pointers 29, for which each element points to triple indirect data blocks 30. If given a block size of 4 kB and a pointer size of 32-bit (4 bytes), a data block can store approximately 1024 pointers. FIG. 3 illustrates a typical 32-bit pointer 40 which stores a unique 32-bit number addressing a respective data block.

A conventional file system may include approximately $2^{32}$ or $2^{64}$ different data blocks resulting in a maximum file system size of multiple terabyte (TB) where newer file systems provide even larger capacities. Therefore, a file system may store a large amount of data, and in order to reduce the amount of physical space required to store the file system's data, a conventional deduplication method may be performed.

Data Deduplication is performed to search for duplicate data objects, such as blocks, chunks, or files, and discards the duplicates, thereby providing a 20:1 reduction of stored data. Once duplicate data is identified, the duplicate data is replaced by a pointer which points to a parent copy of the data, to reduce the amount of data stored.

SUMMARY

The present invention provides a method that enables several files to share the same data blocks within a file system, and that efficiently handles deduplication and management of the data blocks within the file system.

According to one embodiment of the present invention, a method for de-duplicating and managing data blocks within a file system is disclosed. The method includes adding a deduplication identifier to each pointer pointing to a respective data block, the deduplication identifier indicating whether the respective data block is deduplicated, detecting duplicate data blocks within the file system, determining whether at least one of the duplicate data blocks has been deduplicated with other data blocks, when detected, determining that the at least one duplicate data block is a master copy when it is determined that the at least one duplicate data block has been deduplicated, selecting one of the duplicate data blocks to be a master copy when it is determined that the duplicate data blocks have not been deduplicated, and setting the deduplication identifier of a respective pointer of the selected duplicate data block to indicate deduplication, and determining that the other duplicate data block is a new duplicate data block and setting the deduplication identifier of a respective pointer of the other duplicate data block to indicate deduplication, and directing the respective pointer of the other duplicate data block to the master copy.

According to other embodiments of the present invention, a file system and a computer program product performing the method are also provided.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 1 illustrates a data structure for inodes of a conventional file system.

DETAILED DESCRIPTION

Figure 2:
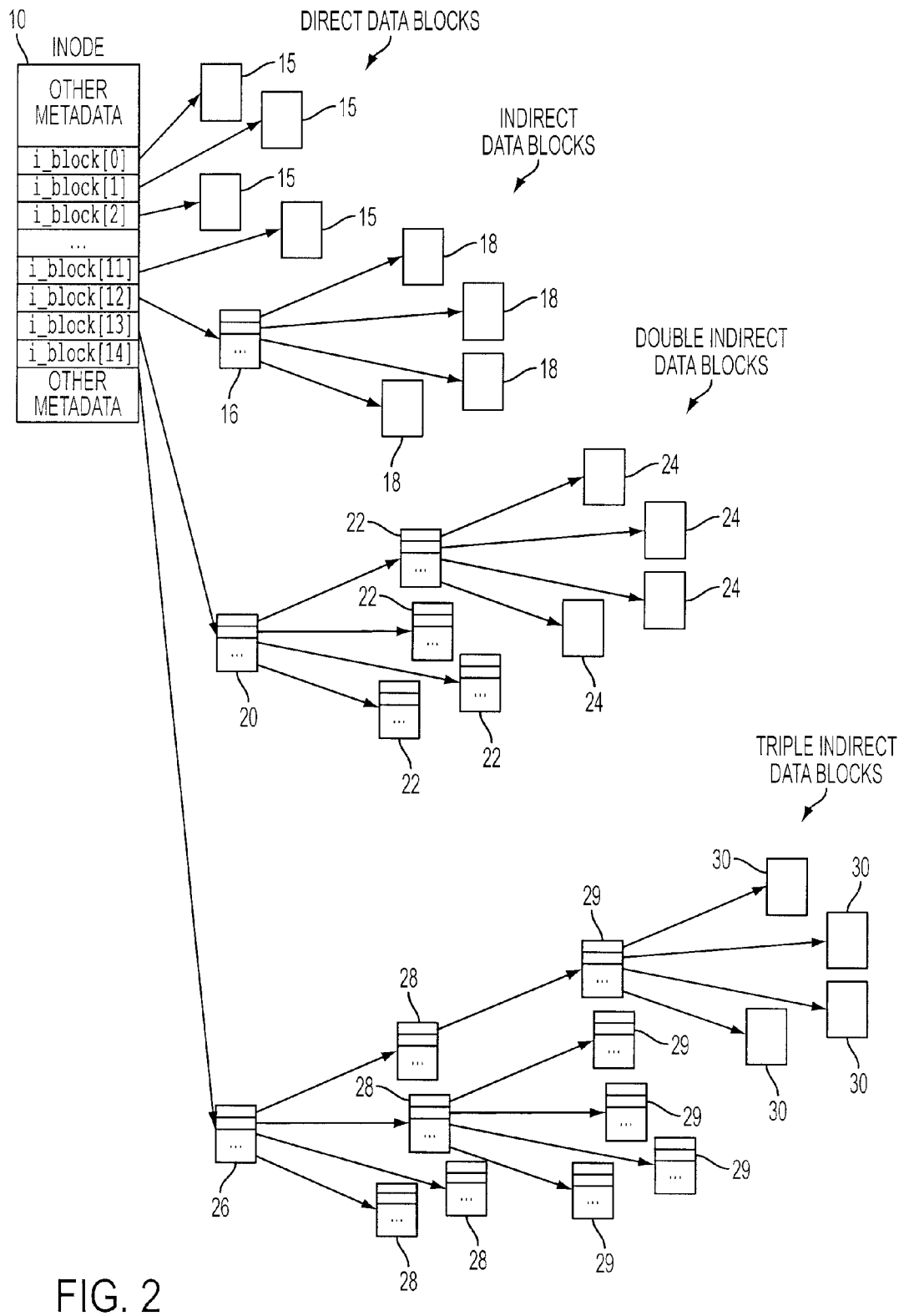
FIG. 2 is a diagram illustrating a relationship between an inode and data blocks of a conventional file system.
Figure 3:
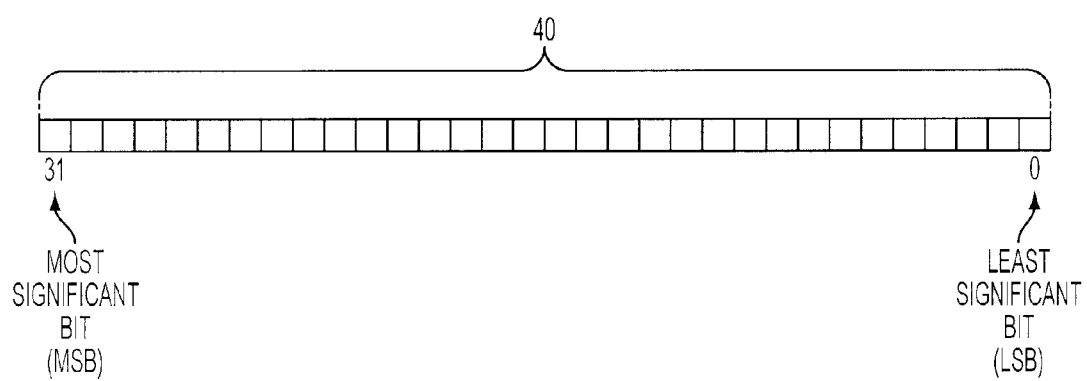
FIG. 3 is a diagram illustrating a conventional 32-bit pointer.
Figures 4, 5:
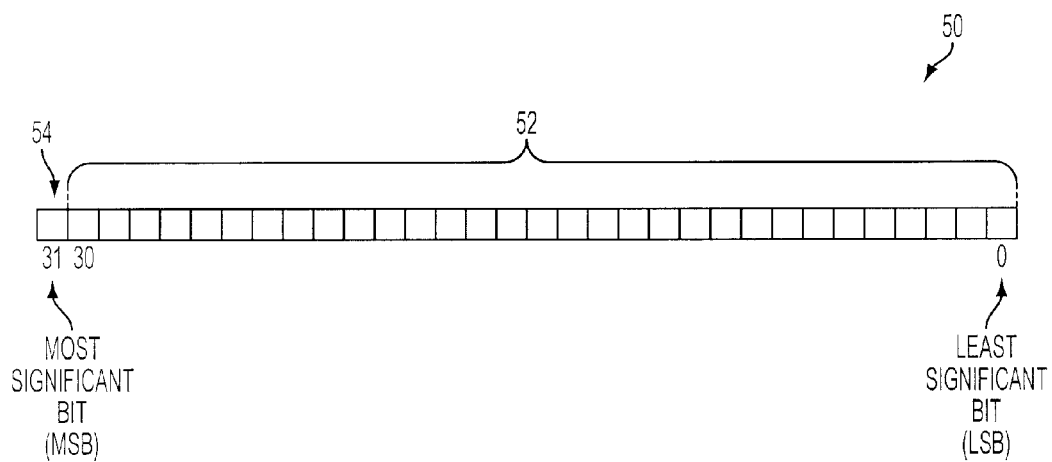
FIG. 4 is a diagram illustrating a 32-bit i_block [. . . ] element including a 31-bit pointer and a deduplication bit that can be implemented within embodiments of the present invention.
FIG. 5 is a lookup table (LUT) illustrating an inventory of deduplicated data blocks that can be implemented within embodiments of the present invention.

With reference now to FIG. 4, there is a 32-bit i_block [. . . ] element 50 for a file system that can be implemented within embodiments of the present invention. The 32 bit i_block [. . . ] element 50 includes a 31-bit pointer 52 and a deduplication bit 54 which is the most significant bit (MSB) and is used to indicate whether the respective data block is deduplicated where when the MSB=1 the data block is deduplicated and when the MSB=0 the data block is not deduplicated. Deduplicated data blocks store multiple identical data chunks of different files or the same file. The 31-bit pointer 52 and the deduplication bit 54 together provide a 32-bit number. In this embodiment, a 31-bit pointer is utilized; however, the present invention is not limited hereto and may vary, as necessary. For example, according to an alternative embodiment, 64 bit i_block [. . . ] including a 63-bit pointer and a deduplication bit may be used.

The present invention provides methods for deduplicating and managing the respective data blocks within the file system. Additional details regarding these methods will be described below with reference to FIGS. 6, 7 and 8.

FIG. 5 illustrates a database (e.g., a lookup table (LUT)) 60 which is used by the file system, according to an embodiment of the present invention, to maintain inventory of the deduplicated data blocks. The LUT 60 is used to determine whether a data block being shared. For example, if a text document is copied, and if a paragraph is appended to the copied document, then the leading data blocks associated with both text documents have identical content and thus identical data blocks which can be deduplicated. Therefore, the LUT 60 shows all other files which share the same data block, for example. As shown, the LUT 60 includes a row for each deduplicated data block and a plurality of columns such as a data block column 62, a block counter column 64 and a pointer list column 66. The data block column 62 records the 31 bit pointer 52 which addresses the single instance of the deduplicated data block. The block counter column 64 records the number of i_block[. . . ] elements which address the deduplicated data block and the pointer list column 66 records a reference to each i block[. . . ] element which addresses the deduplicated block.

Figure 6:
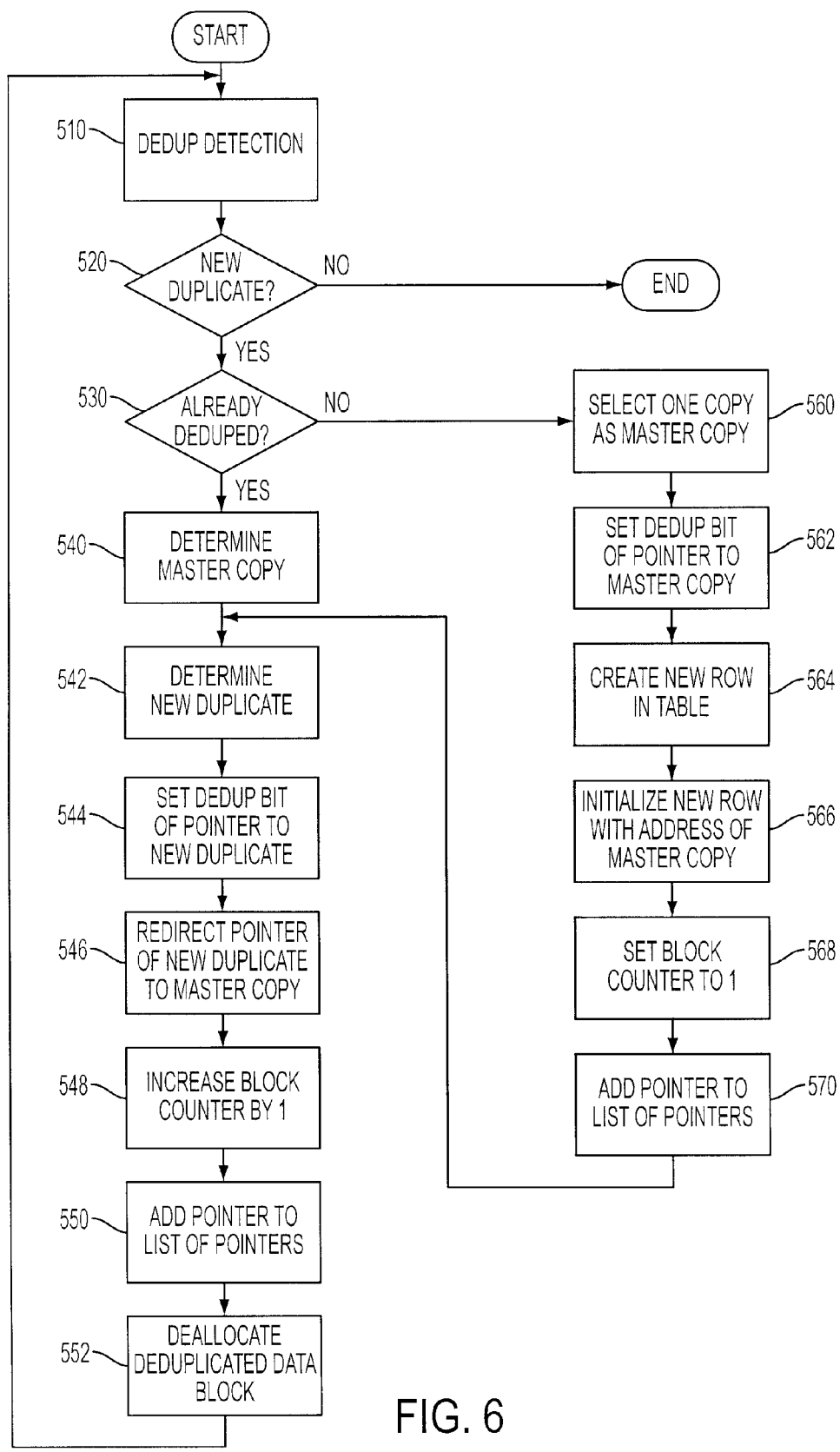
FIG. 6 is a flowchart illustrating an operation for deduplicating duplicate data blocks that can be implemented within embodiments of the present invention.

A detailed description of a method of deduplicating duplicate data blocks will now be described below with reference to FIG. 6.

According to an embodiment of the present invention, the method shown in FIG. 6 may be performed immediately after a new data block has been written or an existing data block is updated (i.e., inband deduplication) or alternatively, it may be scheduled for a later point in time (i.e., outband deduplication). In operation 510 of FIG. 6, deduplication detection is performed to detect duplicate data blocks. From operation 510, the process moves to operation 520 where it is determined whether two duplicate data blocks have been detected. When it is determined in operation 520 that no new duplicate data blocks have been detected, the process ends. On the other hand, when it is determined that two new duplicate data blocks have been detected in operation 520, the process moves to operation 530 where it is determined whether one of the data blocks identified in operation 520, is already deduplicated. When it is determined that neither of the data blocks identified have been deduplicated with other data blocks, the process moves to operation 560 (to be discussed below). On the other hand, when it is determined in operation 530, that one of the data blocks has already been deduplicated with other data blocks, the process moves to operation 540 where a master copy is determined by determining which of the two duplicate data blocks is already deduplicated with other data blocks. According to one embodiment, the determined data block in operation 540 includes an entry in the LUT 60 (shown in FIG. 5) and, therefore, is the master copy of both duplicate data blocks. From operation 540, the process moves to operation 542 where the second duplicate data block which is not the master copy is determined as a "new duplicate data block". From operation 542 the process moves to operation 544 where a deduplicate bit 54 of the i_block[. . . ] element which points to the new duplicate data block is set to '1' to indicate that the new duplicate data block is deduplicated. From operation 544, the process moves to operation 546, where the pointer of the new duplicate is redirected to the master copy. From operation 546, the process moves to operation 548 where a block counter (as depicted in FIG. 5) is increased by '1' indicating that one additional i_block [ . . . ] element is pointing to the master copy. From operation 548, the process moves to operation 550, where a reference to i_block [ . . . ] element of the new duplicate data block is added to the pointer list shown in LUT 60 for the row of the respective master copy. From operation 550, the process moves to operation 552, where the new duplicate data block, which is no longer in use, is de-allocated since it is now replaced by the respective master copy. The process then returns back to operation 510 to detect new duplicate data blocks.

Referring back to operation 530, mentioned above, when it is determined in operation 530 that both data blocks identified in operation 520 have not been deduplicated with other data blocks, the process moves to operation 560 where one of the two duplicate data blocks is selected as the master copy. From operation 560, the process moves to operation 562 where the deduplication bit 54 of the pointer to the master copy is set to '1' to indicate that the master copy is deduplicated. From operation 562, the process moves to operation 564, where a new row is created in the LUT 60 (shown in FIG. 5) for the master copy. From operation 564, the process moves to operation 566 where the data block 62 shown in FIG. 5 of the new row created is filled with the address of the new master copy. From operation 566, the process moves to operation 568 where the block counter 64 is set to '1' indicating that only one i_block [. . . ] element is pointing to the master copy. From operation 568, the process moves to operation 570 where a reference to the i_block [. . . ] of the master copy is added to the pointer list 66 for the respective row shown in FIG. 5. From operation 570, the process then returns to operation 542 where the remaining duplicate data block (i.e., the second duplicate data block) is determined as a new duplicate data block and the process continues through operation 552 and returning to operation 510.

A detailed description of an operation of deleting a data block will now be described with reference to FIG. 7.

Figure 7:
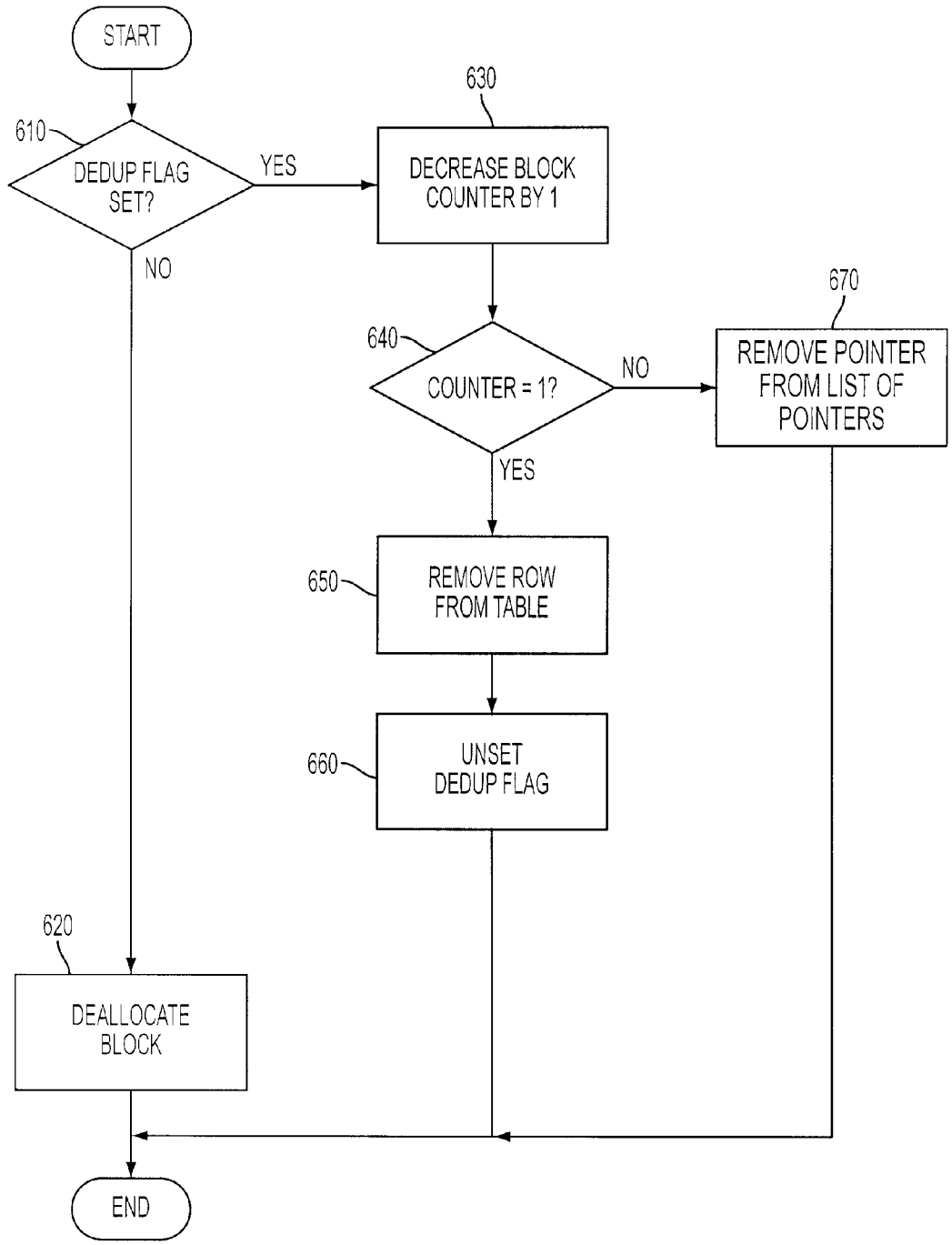
FIG. 7 is a flowchart illustrating an operation for deleting a data block that can be implemented within embodiments of the present invention.

In FIG. 7, an operation of deleting a data block is performed in accordance with an embodiment of the present invention. In operation 610, it is determined whether the deduplication bit 54 of the i_block [. . . ] element which points to the data block to be deleted is set '1'. When it is determined that the deduplication bit is not set to '1', it is determined that the respective data block is not being shared, and the process moves to operation 620 where the data block is de-allocated and the process ends.

On the other hand, when it is determined that the deduplication bit 54 is set to '1' in operation 610, it is determined that the respective data block is being shared and the process moves to operation 630 where the block counter 64 as shown in the entry in LUT 60 which represents the master copy of the deduplicated data block to be deleted, is decreased by '1'. From operation 630, the process moves to operation 640 where it is determined whether the block counter which was decreased by one is now equal to '1'. When it is determined in operation 640 that the block counter is not equal to '1', the process moves to operation 670 where the reference to i_block[. . . ] of the data block to be deleted, is removed from the pointer list, such as item 66 in FIG. 5, and the process ends. On the other hand, when it is determined in operation 640 that the block counter is equal to '1' (i.e., that only one identical data block remains), the process moves to operation 650 where the entry of the master copy of the deduplicated data block which is deleted, is removed from the LUT 60 and the data block is deallocated. According to one embodiment, since there is only one copy of identical blocks remaining, there is no longer a need to maintain the information of duplicates in the LUT 60. From operation 650, the process moves to operation 660 where the deduplication bit 54 of the i_block[. . . ] element which points to the master copy is set to '0' to indicate that the master copy is no longer deduplicated, and the process ends.

According to an alternative embodiment, it can be determined whether the block counter is equal to '0' in operation 640. If so, then the LUT 60 may include entries with the master copies which no longer represent the content of multiple deduplicated data blocks. Thus, a detection of master copies can be performed during off-peak periods at a later time. According to yet another alternative embodiment, if the block counter reaches '1', the deduplication bit may remain unchanged such that the deduplication bit is set but no respective entry is found in LUT 60.

A detailed description of a process for updating an existing data block will now be described with reference to FIG. 8.

Figure 8:
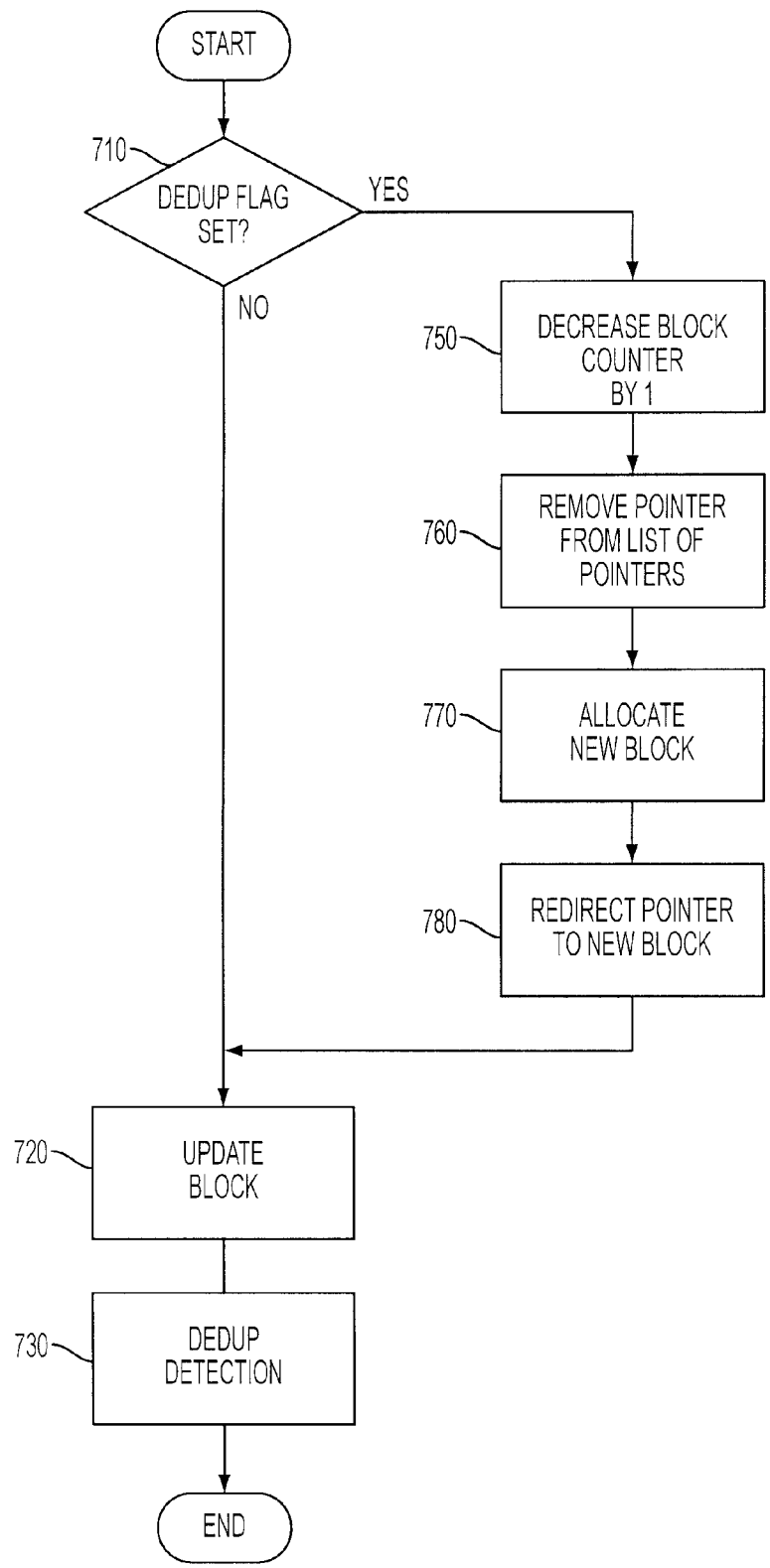
FIG. 8 is flowchart illustrating an operation for updating a data block that can be implemented within embodiments of the present invention.

In FIG. 8, an operation for updating an existing data block is performed according to one embodiment of the present invention, for example, when the content of an existing file is modified. As shown in FIG. 8, at operation 710 it is determined whether the deduplication bit 54 of the i_block[. . . ] element which points to the data block to be updated is set to '1'. When it is determined that the deduplication bit is not set to '1', the process moves to operation 720 where the data block is updated and the process then moves to operation 730 where deduplication is determined (as in operation 510 shown in FIG. 6). On the other hand, when it is determined in operation 710 that the deduplication bit 54 is set to '1', the process moves to operation 750 where the block counter as shown in an entry in LUT 60 which represents a master copy for the data block to be updated, is decreased by '1'. Then, from operation 750, the process moves to operation 760 where the reference to the i_block[. . . ] element of the data block to be updated is removed from the pointer list 66 shown in the LUT 60. From operation 760, the process moves to operation 770 where a new data block is allocated and from operation 770, the process moves to operation 780 where the i_block[. . . ] element which points to the master copy of the data block to be updated is redirected to the new data block. From operation 780, the process then continues to operation 720 where the data block is updated and then proceeds to operation 730 where deduplication is determined.

Since embodiments of the present invention provide data block pointers which each include deduplication identifiers for indicating deduplication of the respective data blocks and a database for tracking inventory of the deduplicated data blocks, the present invention provides the advantage of sharing data blocks while efficiently deduplicating and managing (e.g., updating and deleting) the data blocks within a file system.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. For example, one embodiment includes computer program product comprising a non-transitory, computer useable medium including a computer readable program, wherein the computer readable program when executed on a computer causes the computer to implement a method for deduplicating and managing data blocks within a file system. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for de-duplicating and managing data blocks within a file system, the method comprising:
    adding a deduplication identifier to each pointer pointing to a respective data block, the deduplication identifier indicating whether the respective data block is already deduplicated;
    detecting duplicate data blocks within the file system;
    determining whether at least one of the duplicate data blocks has been deduplicated with other data blocks, when detected;
    determining that the at least one duplicate data block is a master copy when it is determined that the at least one duplicate data block has been deduplicated;
    selecting a first of the duplicate data blocks to be a master copy when it is determined that the duplicate data blocks have not been deduplicated, and setting the deduplication identifier of a respective pointer of the selected duplicate data block to indicate deduplication; and
    determining that a second of the duplicate data blocks is a new duplicate data block and setting the deduplication identifier of a respective pointer of the second duplicate data block to indicate deduplication, and directing the respective pointer of the second duplicate data block to the master copy.

2. The method of claim 1, further comprising:
providing a database including a plurality of entries each corresponding to a respective master copy, to track an inventory of deduplicated data blocks; and
counting, via a counter, a number of pointers associated with each master copy;
and providing a pointer list corresponding to each master copy to indicate each pointer referencing each master copy.

3. The method of claim 2, wherein:
when it is determined that the at least one duplicate data block is a master copy and the respective pointer of the second duplicate data block is directed to the respective master copy, increasing the counter by one for the respective master copy, and adding the pointer of the second duplicate data block to the pointer list corresponding to the respective master copy.

4. The method of claim 3, wherein:
when selecting the first of the duplicate data blocks as a master copy, creating a new entry in the database for the master copy and setting the counter to one for the new entry to represent the duplicate data block selected as the master copy, adding the pointer of the selected duplicate data block to the pointer list corresponding to the respective master copy; and when it is determined that the second of the duplicate data blocks is the new duplicate data block, increasing the counter by one for the respective master copy to represent the second duplicate data block.

5. The method of claim 4, further comprising:
determining whether a data block to be deleted has been deduplicated based on a setting of the deduplication identifier corresponding to the pointer of the data block wherein:
when the respective deduplication identifier indicates that the respective data block has not been deduplicated, deleting the respective data block, and
when the respective deduplication identifier indicates that the respective data block has been deduplicated, deleting the respective data block by decreasing the counter by one, determining whether the counter is equal to one and removing the respective pointer of the data block to be deleted from the pointer list for the associated master copy when it is determined that the counter is greater than one, and deleting the master copy associated with the data block to be deleted from the database when it is determined that the counter is equal to one.

6. The method of claim 4, further comprising:
determining whether a data block to be updated has been deduplicated based on the setting of the deduplication identifier corresponding to the pointer of the data block;
updating the data block when the deduplication identifier indicates that the data block is deduplicated, by decreasing the counter for the entry in the database representing the master copy of the data block to be updated, removing the respective pointer from the pointer list for the respective master copy, and allocating a new data block and directing the respective pointer to the new data block allocated.

7. The method of claim 1, wherein the deduplication identifier is a single, most significant bit (MSB) of a multiple bit i_block element that comprises the deduplication identifier added to the respective pointer, wherein remaining least significant bits of the i_block element comprise each respective pointer.

8. A computer program product comprising a non-transitory, computer useable medium including a computer readable program, wherein the computer readable program when executed on a computer causes the computer to implement a method for deduplicating and managing data blocks within a file system, the method comprising:
adding a deduplication identifier to each pointer pointing to a respective data block, the deduplication identifier indicating whether the respective data block is already deduplicated;
detecting duplicate data blocks within the file system;
determining whether at least one of the duplicate data blocks has been deduplicated with other data blocks, when detected;
determining that the at least one duplicate data block is a master copy when it is determined that the at least one duplicate data block has been deduplicated;
selecting a first of the duplicate data blocks to be a master copy when it is determined that the duplicate data blocks have not been deduplicated, and setting the deduplication identifier of a respective pointer of the selected duplicate data block to indicate deduplication; and
determining that a second of the duplicate data blocks is a new duplicate data block and setting the deduplication identifier of a respective pointer of the second duplicate data block to indicate deduplication, and directing the respective pointer of the second duplicate data block to the master copy.

9. The computer program product of claim 8, wherein the method further comprises:
providing a database including a plurality of entries each corresponding to a respective master copy, to track an inventory of deduplicated data blocks; and
counting, via a counter, a number of pointers associated with each master copy; and providing a pointer list corresponding to each master copy to indicate each pointer referencing each master copy.

10. The computer program product of claim 9, wherein when it is determined that the at least one duplicate data block is a master copy and the respective pointer of the second duplicate data block is directed to the respective master copy, increasing the counter by one for the respective master copy, and adding the pointer of the second duplicate data block to the pointer list corresponding to the respective master copy.

11. The computer program product of claim 10, wherein when selecting the first of the duplicate data blocks as a master copy, creating a new entry in the database for the master copy and setting the counter to one for the new entry to represent the duplicate data block selected as the master copy, adding the pointer of the selected duplicate data block to the pointer list corresponding to the respective master copy; and when it is determined that the second of the duplicate data blocks is the new duplicate data block, increasing the counter by one for the respective master copy to represent the second duplicate data block.

12. The computer program product of claim 11, the method further comprising:
determining whether a data block to be deleted has been deduplicated based on a setting of the deduplication identifier corresponding to the pointer of the data block wherein:
when the respective deduplication identifier indicates that the respective data block has not been deduplicated, deleting the respective data block, and when the respective deduplication identifier indicates that the respective data block has been deduplicated, deleting the respective data block by decreasing the counter by one, determining whether the counter is equal to one and removing the respective pointer of the data block to be deleted from the pointer list for the associated master copy when it is determined that the counter is greater than one, and deleting the master copy associated with the data block to be deleted from the database when it is determined that the counter is equal to one.

13. The computer program product of claim 11, the method further comprising:

determining whether a data block to be updated has been deduplicated based on the setting of the deduplication identifier corresponding to the pointer of the data block;

updating the data block when the deduplication identifier indicates that the data block is deduplicated, by decreasing the counter for the entry in the database representing the master copy of the data block to be updated, removing the respective pointer from the pointer list for the respective master copy, and allocating a new data block and directing the respective pointer to the new data block allocated.

14. The computer program product of claim 8, wherein the deduplication identifier is a single, most significant bit (MSB) of a multiple bit i_block element that comprises the deduplication identifier added to the respective pointer, wherein remaining least significant bits of the i_block element comprise each respective pointer.

* * * * *